US012786977B2

(12) United States Patent
Mu et al.

(10) Patent No.: US 12,786,977 B2
(45) Date of Patent: Nov. 3, 2026

(54) TRANSMISSION METHOD AND DEVICE FOR SDT, AND STORAGE MEDIUM

(71) Applicant: Beijing Xiaomi Mobile Software Co., Ltd., Beijing (CN)

(72) Inventors: Qin Mu, Beijing (CN); Xuemei Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 344 days.

(21) Appl. No.: 18/696,164

(22) PCT Filed: Sep. 30, 2021

(86) PCT No.: PCT/CN2021/122308
§ 371 (c)(1),
(2) Date: Mar. 27, 2024

(87) PCT Pub. No.: WO2023/050354
PCT Pub. Date: Apr. 6, 2023

(65) Prior Publication Data
US 2024/0414703 A1 Dec. 12, 2024

(51) Int. Cl.
*H04W 72/0457* (2023.01)
*H04W 72/23* (2023.01)

(52) U.S. Cl.
CPC ....... *H04W 72/0457* (2023.01); *H04W 72/23* (2023.01)

(58) Field of Classification Search
CPC ............. H04W 72/0457; H04W 72/23; H04W 72/0453; H04W 4/70; H04W 72/53
See application file for complete search history.

(56) References Cited

U.S. PATENT DOCUMENTS

| | | | | |
|---|---|---|---|---|
| 2020/0314631 | A1 | 10/2020 | Tang | |
| 2021/0203449 | A1* | 7/2021 | Chatterjee | H04L 1/1896 |
| 2021/0266920 | A1* | 8/2021 | Yan | H04W 72/56 |
| 2021/0274525 | A1 | 9/2021 | Wei et al. | |
| 2022/0182986 | A1 | 6/2022 | Chen et al. | |
| 2022/0225407 | A1 | 7/2022 | Wang et al. | |
| 2023/0040076 | A1 | 2/2023 | Kim et al. | |
| 2024/0244700 | A1* | 7/2024 | Wu | H04W 72/0457 |

(Continued)

FOREIGN PATENT DOCUMENTS

| | | |
|---|---|---|
| CN | 111194089 A | 5/2020 |
| CN | 112261644 A | 1/2021 |
| CN | 112449418 A | 3/2021 |

(Continued)

OTHER PUBLICATIONS

ISA State Intellectual Property Office of the People's Republic of China, International Search Report Issued in Application No. PCT/CN2021/122308, Jan. 28, 2022, WIPO, 4 pages.

(Continued)

*Primary Examiner* — Hashim S Bhatti
(74) *Attorney, Agent, or Firm* — Volpe Koenig

(57) ABSTRACT

A transmission method for small data transmission (SDT) is performed by a terminal, and includes: determining, in response to the terminal being configured with a plurality of initial bandwidth parts (BWPs), a target BWP, from the plurality of initial BWPs, for a SDT performed by the terminal; and performing, based on the target BWP, the SDT.

13 Claims, 5 Drawing Sheets

(56) References Cited

U.S. PATENT DOCUMENTS

| | | | | |
|---|---|---|---|---|
| 2024/0292328 | A1* | 8/2024 | Chen | H04W 4/06 |
| 2024/0334527 | A1* | 10/2024 | Turtinen | H04W 48/16 |

FOREIGN PATENT DOCUMENTS

| | | | |
|---|---|---|---|
| CN | 113170475 | A | 7/2021 |
| CN | 113329493 | A | 8/2021 |
| WO | 2020231316 | A1 | 11/2020 |
| WO | 2021139828 | A1 | 7/2021 |
| WO | 2021163394 | A1 | 8/2021 |

OTHER PUBLICATIONS

State Intellectual Property Office of the People's Republic of China, Office Action and Search Report Issued in Application No. 2021800031775, Jun. 9, 2023, 20 pages. (Submitted with Machine/Partial Translation).

State Intellectual Property Office of the People's Republic of China, Office Action and Search Report Issued in Application No. 2021800031775, Nov. 28, 2023, 24 pages. (Submitted with Machine/Partial Translation).

Huawei etc. "SDT aspects common for RACH-based and CG-based SDT scheme" "3GPP TSG-RAN WG2 #112-e R2-2009930 Online, Nov. 2-13, 2020" Oct. 23, 2020, 17 pages.

LG Electronics Inc. "Separate BWP for Small Data Transmission" "3GPP TSG-RAN2#113-e R2-2100782 Online, Jan. 25-Feb. 5, 2021" Jan. 15, 2021, 3 pages.

* cited by examiner

TRANSMISSION METHOD AND DEVICE FOR SDT, AND STORAGE MEDIUM

CROSS REFERENCE TO RELATED APPLICATIONS

This application is a National Phase of International Application No. PCT/CN2021/122308, filed on Sep. 30, 2021, the entire contents of which are incorporated herein by reference in their entireties.

TECHNICAL FIELD

The present disclosure relates to the field of communication technologies, and in particular relates to a transmission method for small data transmission (SDT), a transmission device for SDT, and a storage medium.

BACKGROUND

In the related art, two major technologies, machine type communication (MTC) and narrow band internet of thing (NB-IoT), have been proposed to support IoT services. These two technologies are mainly aimed at low speed, high latency and other scenarios, for example, in a meter reading scenario and an environmental monitoring scenario. At present, the NB IoT can only support a speed of up to a few hundred Kb/s, and the MTC can only support a speed of up to a few Mb/s. With the continuous development of IoT services, for example, video surveillance, smart homes, wearable devices, and industrial sensor monitoring, these services typically require speeds ranging from 10 Mb/s to 100 Mb/s and also have relatively high latency requirements. However, it is difficult for the MTC technology and the NB IoT technology in the related art to meet these requirements. Therefore, a new type of user equipment in a new airport of a 5th generation (5G) mobile communication system is proposed to cover the requirements of mid-range IoT devices. In the current 3rd generation partnership project (3GPP) standardization, this new type of user equipment is called a reduced capability user equipment (Redcap UE) or a new radio lightweight terminal (NR-lite). This Redcap terminal is relative to an ordinary terminal.

In the related art, in an NR system, an initial bandwidth part (initial BWP) is defined, hereinafter referred to as a first Initial BWP. Taking into account factors such as center frequency-alignment for time-division multiplexing of the Redcap terminal, a special initial BWP for the Redcap terminal has also been defined in the related art, hereinafter referred to as a second initial BWP.

In the discussion of NR release 17, it is proposed to support configuration-granted SDT (CG-SDT). In the SDT technology, a separate SDT BWP (separate CG-SDT BWP) can be configured for a terminal supporting the SDT on the Initial BWP. When the terminal supporting the SDT is configured with a separate SDT BWP, the terminal can transmit a small packet on the separate CG-SDT BWP, such that the bandwidth requirement for the transmission of the small packet is ensured, and the degree of congestion on the Initial BWP is reduced.

When a network device configures multiple initial BWPs for a Redcap terminal, such as a first initial BWP and a second initial BWP, which BWP should be used for the SDT is a problem that needs to be solved.

SUMMARY

In order to overcome the problem in the related art, the present disclosure provides a transmission method for small data transmission (SDT), a transmission device for SDT, and a storage medium.

According to a first aspect of embodiments of the present disclosure, there is provided a transmission method for SDT, performed by a terminal, and including: determining, in response to the terminal being configured with a plurality of initial bandwidth parts (BWPs), a target BWP, from the plurality of initial BWPs, for an SDT performed by the terminal; and performing, based on the target BWP, the SDT.

In an embodiment, the plurality of initial BWPs include a first initial BWP and a second initial BWP, and the target BWP includes the first initial BWP or the second initial BWP.

In an embodiment, the first initial BWP includes a first initial uplink BWP, the second initial BWP includes a second initial uplink BWP, and performing, based on the target BWP, the SDT includes: performing an uplink SDT on the first initial uplink BWP or the second initial uplink BWP.

In an embodiment, the first initial BWP includes a first initial downlink BWP, the second initial BWP includes a second initial downlink BWP, and performing, based on the target BWP, the SDT includes: performing a downlink SDT on the first initial downlink BWP or the second initial downlink BWP.

In an embodiment, determining the target BWP, from the plurality of initial BWPs, for the SDT performed by the terminal includes: determining the first initial BWP as the target BWP for the SDT performed by the terminal.

In an embodiment, determining the target BWP, from the plurality of initial BWPs, for the SDT performed by the terminal includes: determining the second initial BWP as the target BWP for the SDT performed by the terminal.

In an embodiment, the method further includes: determining an initial BWP monitored on a cell on which the terminal camps; and determining that, in response to the target BWP being different from the initial BWP, the SDT is completed, and switching to the initial BWP.

In an embodiment, the target BWP is a second initial downlink BWP, and the initial BWP is a first initial downlink BWP.

In an embodiment, the method further includes: performing a measurement for a synchronization signal and physical broadcast channel (PBCH) block (SSB) on the first initial downlink BWP.

In an embodiment, the method further includes: performing an SSB on the second initial downlink BWP, where the second initial downlink BWP is configured with at least one of an SSB and a paging message.

In an embodiment, determining the target BWP, from the plurality of initial BWPs, for the SDT performed by the terminal includes: receiving indication information transmitted by a network device, where the indication information is configured to indicate the target BWP for the SDT performed by the terminal, and the target BWP is a BWP from the plurality of initial BWPs; and determining, based on the indication information, the target BWP, from the plurality of initial BWPs, for the SDT performed by the terminal.

In an embodiment, determining the target BWP, from the plurality of initial BWPs, for the SDT performed by the terminal includes: determining, based on a predefined rule, the target BWP, from the plurality of initial BWPs, for the SDT performed by the terminal.

In an embodiment, determining, based on the predefined rule, the target BWP, from the plurality of initial BWPs, for the SDT performed by the terminal includes: in response to the terminal being configured with a first initial uplink BWP and a second initial uplink BWP, and a bandwidth of the first initial uplink BWP and a bandwidth of the second initial uplink BWP both being less than a receiving and transmitting bandwidth of the terminal, determining the first initial uplink BWP or the second initial uplink BWP as the target BWP for the SDT performed by the terminal; or in response to the terminal being configured with a first initial uplink BWP and a second initial uplink BWP, and a bandwidth of the first initial uplink BWP and/or a bandwidth of the second initial uplink BWP being greater than a receiving and transmitting bandwidth of the terminal, determining that an initial uplink BWP that satisfies a reception capability of the terminal is the target BWP for the SDT performed by the terminal.

In an embodiment, determining, based on the predefined rule, the target BWP, from the plurality of initial BWPs, for the SDT performed by the terminal includes at least one of: determining, in response to the second initial downlink BWP being configured with at least one of a SSB and a paging message, the second initial downlink BWP as the target BWP for the SDT performed by the terminal; determining, in response to the second initial downlink BWP being not configured with at least one of a synchronization SSB and a paging message, the first initial downlink BWP as the target BWP for the SDT performed by the terminal; or determining, based on a BWP on which an uplink SDT is performed, a target BWP for a downlink SDT.

In an embodiment, determining, based on the BWP on which the uplink SDT is performed, the target BWP for the downlink SDT includes: determining an initial downlink BWP having a same center frequency as an initial uplink BWP on which the uplink SDT is performed as the target BWP for the downlink SDT; or determining an initial downlink BWP having a same BWP identifier as an initial uplink BWP on which the uplink SDT is performed as the target BWP for the downlink SDT.

According to a second aspect of embodiments of the present disclosure, there is provided a transmission method for SDT, performed by a network device, and including: transmitting indication information, where the indication information is configured to indicate a target bandwidth part (BWP) for a SDT performed by a terminal, and the target BWP is a BWP from a plurality of initial BWPs.

According to a third aspect of embodiments of the present disclosure, there is provided a transmission device for SDT, including: a processor; and a memory storing instructions; where the instructions, when executed by the processor, cause the processor to perform the method of the first aspect or any one of the embodiments of the first aspect.

According to a fourth aspect of embodiments of the present disclosure, there is provided a transmission device for SDT, including: a processor; and a memory storing instructions; where the instructions, when executed by the processor, cause the processor to perform the method of the second aspect.

According to a fifth aspect of embodiments of the present disclosure, there is provided a non-transitory storage medium, storing instructions thereon, where the instructions, when executed by a processor of a terminal, cause the terminal to perform the method of the first aspect or any one of the embodiments of the first aspect.

According to a sixth aspect of embodiments of the present disclosure, there is provided a non-transitory storage medium, storing instructions thereon, where the instructions, when executed by a processor of a terminal, cause the terminal to perform the method of the second aspect.

It will be understood that the above general description and the later detailed description are exemplary and explanatory only and do not limit the present disclosure.

BRIEF DESCRIPTION OF THE DRAWINGS

The accompanying drawings, which are incorporated herein and form a part of the specification, illustrate embodiments consistent with the present disclosure and are used in conjunction with the specification to explain the principles of the present disclosure.

DETAILED DESCRIPTION OF THE EMBODIMENTS

Figure 1:
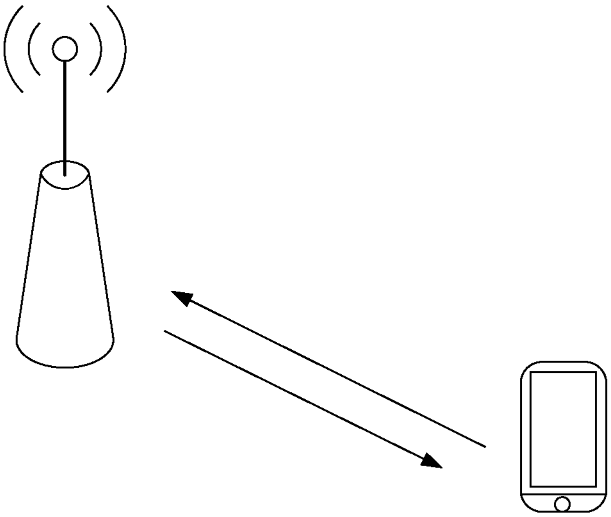
FIG. 1 is a schematic diagram illustrating a wireless communication system according to an embodiment.

Embodiments will be described in detail herein, with the illustrations thereof represented in the drawings. Where the following description relates to the drawings, unless otherwise indicated, the same numerals in different drawings represent the same or similar elements. The embodiments described in the following exemplary embodiments do not represent all embodiments consistent with the present disclosure. Rather, they are merely examples of apparatuses and methods consistent with some aspects of the present disclosure as detailed in the appended claims.

The transmission method for SDT provided by embodiments of the present disclosure may be applied in the wireless communication system shown in FIG. 1. Referring to FIG. 1, the wireless communication system includes a terminal and a network device. Information is sent and received between the terminal and the network device via wireless resources.

It is to be understood that the wireless communication system shown in FIG. 1 is for schematic illustration only, and that other network devices may be included in the wireless communication system, such as a core network device, a wireless relay device, and a wireless backhaul device may also be included, which are not pictured in FIG. 1. The embodiment of the present disclosure does not limit the number of network devices and terminals included in the wireless communication system.

It will be further understood that the wireless communication system of the embodiments of the present disclosure is a network providing a wireless communication function. The wireless communication systems can adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. Depending on the capacity, rate, delay and other factors of different networks can be categorized into a 2nd generation (2G) network, a 3rd generation (3G) network, a 4th generation (4G) network or a future evolutionary network such as a 5th generation (5G) network, which can also be referred to as a new radio (NR) network. For ease of description, the present disclosure sometimes refers to a wireless communication network simply as a network.

Further, the network devices involved in the present disclosure may also be referred to as a wireless access network device. The wireless access network device may be a base station, an evolved node base station (evolved node B), a home base station, an access point (AP), a wireless relay node, a wireless return node, a transmission point (TP), or a transmission and reception point (TRP), and the like, and may also be a next generation node B (gNB) in a NR system, alternatively, may be a component or a part of devices that constitutes a base station, etc. The network device may also be an on-board device when it is a vehicle-to-everything (V2X) communication system. It will be understood that the embodiments of the present disclosure do not limit the specific technology and the specific state of the device used for the network device.

Further, a terminal involved in the present disclosure, which may also be referred to as a terminal device, a user equipment (UE), a mobile station (MS), a mobile terminal (MT), etc., is a device that provides voice and/or data connectivity to a user, e.g., the terminal may be a device with a wireless connectivity, a handheld device, an on-board device, etc. Currently, some examples of terminals include: a mobile phone, a pocket personal computer (PPC), a palmtop computer, a personal digital assistant (PDA), a laptop computer, a tablet computer, a wearable device, or an on-board device, etc. In addition, when it is a vehicle-to-everything (V2X) communication system, the terminal device can also be an on-board device. It will be understood that the embodiments of the present disclosure do not limit the specific technology and the specific state of the terminal.

Embodiments of the present disclosure relate to terminals that may be understood to be a new type of terminal designed in 5G NR, such as a reduced capability terminal. The reduced capability terminal is sometimes referred to as a Redcap terminal, or a new radio lightweight terminal (NR-lite). In the embodiments of the present disclosure, the new terminal is referred to as a Redcap terminal.

Similar to internet of thing (IoT) devices in long term evolution (LTE), a 5G NR-lite typically needs to meet the following requirements: low cost, and low complexity; some degree of coverage enhancement; and power saving.

Since current NR systems are designed for high-end terminals with high speed and low latency, the current design cannot meet the above requirements of NR-lite. Therefore, the current NR systems need to be modified to meet the requirements of NR-lite. For example, in order to meet the requirements of low cost and low complexity, the radio frequency (RF) bandwidth of NR-IoT can be limited to 5 M Hz or 10 M Hz, or the size of the buffer of the NR-lite can be limited, such that the size of the transmission block received each time is limited. For the power saving, a possible optimization direction is to simplify the communication process, so as to reduce the number of times the NR-lite terminal detects the downlink control channel, and so on.

In related art, in order to better support terminals that cannot handle the entire carrier bandwidth and receive bandwidth adaptation, the NR standard defines a bandwidth part (BWP). In the NR system, an idle/inactive terminal is configured with an initial BWP. When the terminal enters an inactive state from a connected state, the terminal will camp on the initial BWP and monitor the initial BWP. In related art, an initial BWP specifically designed for the Redcap terminal has also been defined. That is, for the Redcap terminal, there are two initial BWPs configured. When there are two initial BWPs in the system, how does the terminal select the monitored initial BWP for detecting a paging message when entering the radio resource control (RRC)-INACTIVE or idle state from the connected state (also known as CONNCETED state or RRC-CONNCETED state).

The initial BWP involved in embodiments of the present disclosure includes an initial downlink bandwidth part (initial DL BWP) or an initial uplink bandwidth part (initial UL BWP).

For example, the initial DL BWP and the initial UL BWP are defined in the NR system. The terminal in the inactive/idle state needs to monitor a synchronization signal and physical broadcast channel (PBCH) block (SSB), a paging message, etc., on the initial DL BWP. Considering the time division duplexing (TDD) center frequency-alignment of the Redcap terminal, the related art defines the initial DL BWP and the initial UL BWP for the Redcap terminal. That is, for the Redcap terminal, there are two Initial DL BWPs and two Initial UL BWPs in the network.

In related art, the transmission for (small data transmission) SDT is proposed and is supported by configuring a separate SDT BWP on the Initial BWP for the SDT performed by the terminal. It will also be understood that when the terminal is configured for the small data transmission, the uplink transmission and the corresponding downlink reception for the SDT are performed on the initial UL BWP and the initial DL BWP, respectively. However, when the terminal is configured with a plurality of initial BWPs, which BWP should be used for the SDT is a problem that needs to be addressed.

An embodiment of the present disclosure provides a transmission method for SDT, and selecting a target BWP for the SDT by the terminal from the plurality of initial BWPs is supported in the method.

Figure 2:
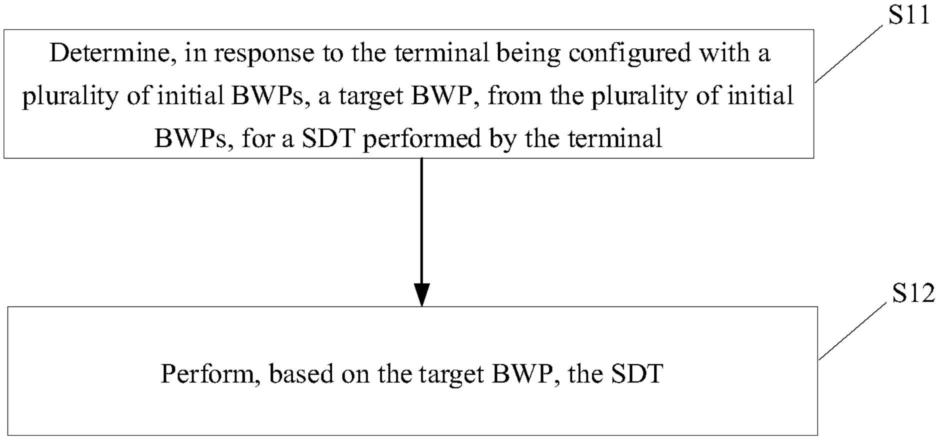
FIG. 2 is a flowchart illustrating a transmission method for SDT according to an embodiment.

FIG. 2 is a flowchart illustrating a transmission method for SDT according to an embodiment. As shown in FIG. 2, the transmission method for SDT is performed by the terminal, and includes the following steps S11 and S12.

At step S11, in response to the terminal being configured with a plurality of initial BWPs, a target BWP for an SDT performed by the terminal is determined from the plurality of initial BWPs.

At step S12, the SDT is performed based on the target BWP.

In the embodiment of the present disclosure, in the case where the terminal is configured with the plurality of initial BWPs, the target BWP for the SDT performed by the terminal is determined from the plurality of initial BWPs, and the SDT is performed based on the target BWP, such that selecting a BWP for performing the SDT is achieved in the case where the terminal is configured with the plurality of initial BWPs.

In embodiments of the present disclosure, the plurality of initial BWPs may be of different bandwidths so as to be applicable to terminals with different types of capabilities to perform a communication based on the initial BWP that applies to their own bandwidth capabilities. For example, an initial BWP that can support the bandwidth capability of a Redcap terminal may be determined from the plurality of initial BWPs, such that the Redcap terminal can perform a communication in the initial BWP applicable to the Redcap terminal. In embodiments of the present disclosure, different initial BWPs may be configured for different bandwidth capabilities of different types of terminals. Different types of terminals may have different capabilities. For example, the capabilities of the terminals may be a transmitting and receiving bandwidth, a number of transmitting and receiving antennas, a maximum number of bits in a transmission block, and a processing time delay. The different capabilities of the terminals may be different in one or more of the transmitting and receiving bandwidth, the number of transmitting and receiving antennas, the maximum number of bits in the transmission block, and the processing time delay.

Any two different types of terminals among the different types of terminals may be referred to in the embodiments of the present disclosure as a first type of terminal and a second type of terminal for ease of description.

The first type of terminal and the second type of terminal in the embodiments of the present disclosure may be of different capabilities. For example, the capabilities of the terminals may be the transmitting and receiving bandwidth, the number of transmitting and receiving antennas, the maximum number of bits in the transmission block, and the processing time delay. The different capabilities of the terminals may be different in one or more of the transmitting and receiving bandwidth, the number of transmitting and receiving antennas, the maximum number of bits in the transmission block, and the processing time delay.

Any two different initial BWPs of the plurality of initial BWPs are referred to in the embodiments of the present disclosure as a first initial BWP and a second initial BWP for descriptive convenience. The first initial BWP and the second initial BWP may be terminals that are suitable for different types of capabilities. That is, in a possible implementation, the plurality of initial BWPs may include at least one BWP corresponding to a Redcap UE, and at least one BWP corresponding to a normal UE, and the Redcap UE may use the BWP corresponding to the normal UE.

In an embodiment, the first initial BWP belongs to a bandwidth capability range of the first type of terminal. The second initial BWP belongs to a bandwidth capability range of the second type of terminal. The capability of the first type of terminal is greater than the capability of the second type of terminal.

In the embodiments of the present disclosure, the first initial BWP belonging to the bandwidth capability range of the first type of terminal may be understood to be a general-purpose initial BWP. The second initial BWP belonging to the bandwidth capability range of the second type of terminal may be understood to be an initial BWP that is dedicated to the second type of terminal.

For example, in an example, the first type of terminal may be an ordinary terminal (not a Redcap terminal), and the second type of terminal may be a Redcap terminal (reduced capability UE). The ordinary terminal is relative to a Redcap terminal. For example, the ordinary terminal may be a UE that supports NR. The Redcap terminal may be configured with at least one first initial BWP and at least one second initial BWP.

The terminal involved in an embodiment of the present disclosure may be a Redcap terminal that is configured with a plurality of initial BWPs including a first initial BWP and a second initial BWP, and is configured to support the SDT.

In an embodiment, the plurality of initial BWPs includes the first initial BWP and the second initial BWP. Atarget BWP for the SDT performed by the terminal includes the first initial BWP or the second initial BWP.

In an embodiment of the present disclosure, the plurality of initial BWPs with which the terminal is configured may be an initial UL BWP or an initial DL BWP.

In an embodiment, the first Initial BWP includes a first initial UL BWP, and the second initial BWP includes a second initial UL BWP. The target BWP for the SDT performed by the terminal may include the first initial UL BWP, and the terminal may perform an uplink SDT on the first initial UL BWP. Alternatively, the target BWP for the SDT performed by the terminal may include the second initial UL BWP, and the terminal may perform an uplink SDT on the second initial UL BWP.

In an embodiment, the first initial BWP includes a first initial DL BWP, and the second initial BWP includes a second initial DL BWP. The target BWP for the SDT performed by the terminal may include the first initial DL BWP, and the terminal may perform an uplink SDT on the first initial DL BWP. Alternatively, the target BWP for the SDT performed by the terminal may include the second initial DL BWP, and the terminal may perform an uplink SDT on the second initial DL BWP.

In the following embodiments of the present disclosure, for cases where no distinction is made between uplink or downlink, the terminal being configured with the plurality of initial BWPs may be understood to mean that the terminal is configured with the plurality of initial DL BWPs, or is configured with the plurality of initial UL BWPs. The first initial BWP and the second initial BWP may be initial DL BWPs or initial UL BWPs. For example, the first initial BWP is a first initial UL BWP, and the second initial BWP is a second initial UL BWP. For example, the first initial BWP is a first initial DL BWP, and the second initial BWP is a second initial DL BWP.

The embodiments of the present disclosure will hereinafter explain a manner of determining a target BWP for the SDT in a case where the terminal is configured with a plurality of initial BWPs and is configured to perform the SDT.

In an embodiment of the present disclosure, a default BWP may be set as the target BWP for the SDT performed by the terminal, and such manner may also be referred to as being the adoption of a default manner of selecting, from the plurality of initial BWPs, the initial BWP for the SDT performed by the terminal.

Figure 3:
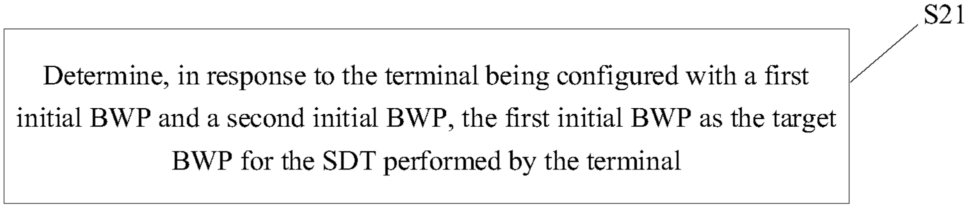
FIG. 3 is a flowchart illustrating a transmission method for SDT according to another embodiment.

FIG. 3 is a flowchart illustrating a transmission method for SDT according to another embodiment. As shown in FIG. 3, the transmission method for SDT is performed by a terminal and includes the following step S21.

At step S21, in response to the terminal being configured with a first initial BWP and a second initial BWP, the first initial BWP is determined as the target BWP for the SDT performed by the terminal.

In an example, the first initial BWP is determined as the target BWP for the SDT performed by the terminal, i.e., the terminal always performs the SDT on the first initial BWP. For example, if the terminal is a Redcap terminal, when the terminal is configured for the SDT, in response to the Redcap terminal being configured with two sets of initial UL BWPs, the Redcap terminal by default performs the uplink SDT on the first initial UL BWP. As another example, the terminal is a Redcap terminal, and when the terminal is configured for the SDT, in response to the Redcap terminal being configured with two sets of initial UL BWPs, the Redcap terminal by default performs the downstream SDT on the first initial DL BWP.

Figure 4:
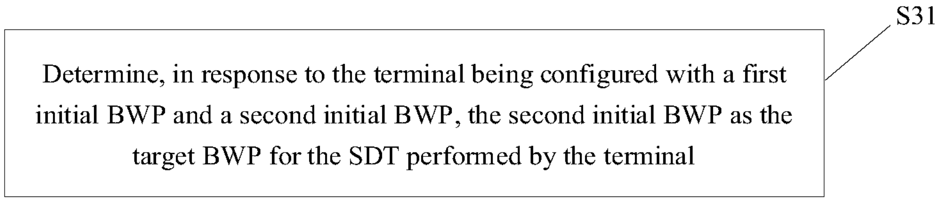
FIG. 4 is a flowchart illustrating a transmission method for SDT according to yet another embodiment.

FIG. 4 is a flowchart illustrating a transmission method for SDT according to yet another embodiment. As shown in FIG. 4, the transmission method for SDT is performed by a terminal and includes the following step S31.

At step S31, in response to the terminal being configured with a first initial BWP and a second initial BWP, the second initial BWP is determined as the target BWP for the SDT performed by the terminal.

In an example, the first initial BWP is determined as the target BWP for the SDT performed by the terminal, i.e., the terminal always performs the SDT on the second initial BWP. For example, if the terminal is a Redcap terminal, when the terminal is configured for the SDT, in response to the Redcap terminal being configured with two sets of initial UL BWPs, the Redcap terminal by default performs the uplink SDT on the second initial UL BWP. As another example, the terminal is a Redcap terminal, and when the terminal is configured for the SDT, in response to the Redcap terminal being configured with two sets of initial UL BWPs, the Redcap terminal by default performs the downstream SDT on the second initial DL BWP.

In the embodiments of the present disclosure, in the case where the terminal is configured to perform the downlink SDT, the terminal also needs to determine an initial BWP monitored on a cell on which the terminal camps, and performs communication based on the initial BWP on which the terminal camps, and the target BWP on which the SDT is performed.

Figure 5:
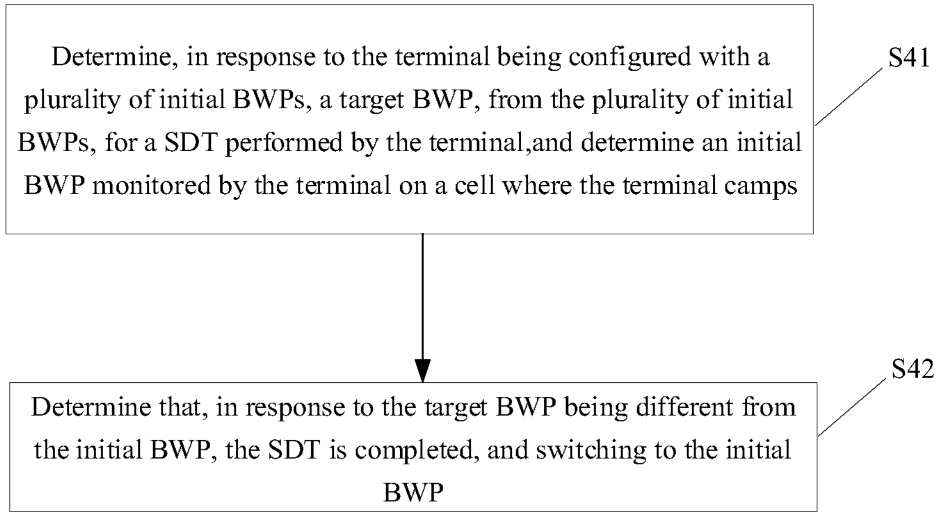
FIG. 5 is a flowchart illustrating a transmission method for SDT according to sill another embodiment.

FIG. 5 is a flowchart illustrating a transmission method for SDT according to sill another embodiment. As shown in FIG. 5, the SDT method is performed by a terminal and includes the following steps S41 and S42.

At step S41, in response to the terminal being configured with a plurality of initial BWPs, a target BWP for a SDT performed by the terminal is determined from the plurality of initial BWPs, and an initial BWP monitored on a cell on which the terminal camps is determined.

At step S42, in response to the target BWP being different from the initial BWP, the terminal determines that the SDT is completed, and switches to the initial BWP.

In an embodiment of the present disclosure, the target BWP may be a first initial DL BWP, and the initial BWP monitored on the cell on which the terminal camps may be a second initial DL BWP.

The target BWP for the downlink SDT performed by the Redcap terminal is the first initial DL BWP by default, that is, the terminal performs the downlink reception for SDT on the first initial DL BWP by default. The terminal camps on the second initial DL BWP, that is, the initial DL BWP that the terminal monitors on the stationary cell is the second initial DL BWP by default, and the terminal switches to the second DL BWP after the downlink reception for SDT is completed on the first initial DL BWP.

In another embodiment of the present disclosure, the target BWP may be the second initial DL BWP, and the initial BWP monitored on the cell on which the terminal camps may be the first initial DL BWP.

In the embodiments of the present disclosure, the target BWP is the second initial DL BWP, and in the case where the initial BWP monitored on the cell on which the terminal camps is the first initial DL BWP, the terminal also needs to perform a synchronization signal and physical broadcast channel (PBCH) block (SSB) measurement.

On the one hand, the target BWP for the downlink SDT performed by the Redcap terminal is by default the second initial DL BWP, i.e., the terminal performs the downlink reception for SDT on the second initial DL BWP by default. The terminal camps on the first initial DL BWP, i.e., the initial BWP monitored on the cell on which the terminal camps is the first initial DL BWP by default. The terminal can switch to the second Initial DL BWP for the downlink reception for SDT after the SSB measurement is performed on the first initial DL BWP. The terminal switches to the first initial DL BWP after finishing the downlink reception for SDT on the second initial DL BWP.

On the other hand, the target BWP for the downlink SDT performed by the Redcap terminal is by default the second initial DL BWP, i.e., the terminal performs the downlink reception for SDT on the second initial DL BWP by default. The terminal camps on the first initial DL BWP, i.e., the initial BWP monitored on the cell on which the terminal camps is the first initial DL BWP by default. The second DL BWP is configured with at least one of SSB and a paging message, and the terminal can perform SSB measurement on the second DL BWP. The terminal performs measurement and synchronization, and performs the downlink reception for SDT based on the SSB on the second DL BWP. The terminal switches to the first initial DL BWP after finishing the downlink reception for SDT on the second initial DL BWP.

It will be understood that in the embodiments of the present disclosure, the target BWP for the downlink SDT performed by the Redcap terminal is by default the first initial DL BWP, i.e., the terminal performs the downlink reception for SDT on the first initial DL BWP by default. The terminal camps on the first initial DL BWP, i.e., the initial BWP monitored on the cell, on which the terminal camps, is by default the first initial DL BWP, and the terminal does not need to perform BWP switching after the downlink reception for SDT is performed on the first Initial DL BWP.

In another embodiment provided by the present disclosure, a target BWP for the SDT performed by the terminal may be determined based on the network configuration, i.e., an initial BWP for the SDT performed by the terminal is selected from the plurality of initial BWPs based on the network configuration.

In the embodiments of the present disclosure, the network device may indicate, via indication information, an initial BWP on which the terminal performs the SDT. For example, before the terminal performs the RRC connection release, or during the process of performing the RRC connection release, the network device transmits the indication information for indicating an initial BWP on which the terminal performs the SDT. That is, the indication information is used to indicate the target BWP on which the terminal is to perform the SDT, where the target BWP is a BWP from the plurality of initial BWPs.

Figure 6:
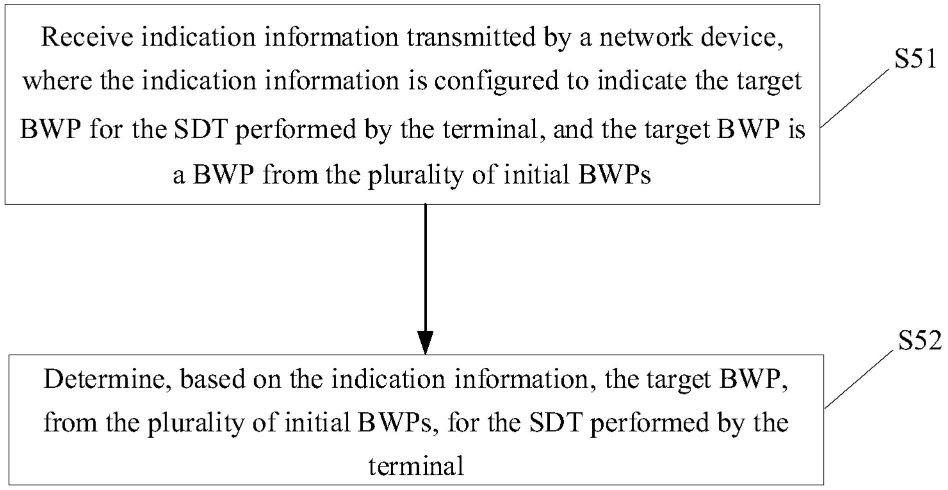
FIG. 6 is a flowchart illustrating a transmission method for SDT according to still another embodiment.

FIG. 6 is a flowchart illustrating a transmission method for SDT according to still another embodiment. As shown in FIG. 6, the transmission method for SDT is performed by a terminal and includes the following steps S51 and S52.

At step S51, indication information transmitted by a network device is received, where the indication information is configured to indicate the target BWP for the SDT performed by the terminal, and the target BWP is a BWP from the plurality of initial BWPs.

At step S52, the target BWP, from the plurality of initial BWPs, for the SDT performed by the terminal is determined based on the indication information.

The plurality of initial BWPs includes a first initial BWP and a second initial BWP. On the one hand, the indication information is used to indicate the first initial BWP on which the terminal performs the SDT. On the other hand, the indication information is used to indicate the second initial BWP on which the terminal performs the SDT.

In another embodiment provided by the present disclosure, the target BWP on which the terminal performs the SDT may be determined based on a predefined rule, that is, the initial BWP on which the terminal performs the SDT is selected from the plurality of initial BWPs based on the predefined rule.

Figure 7:
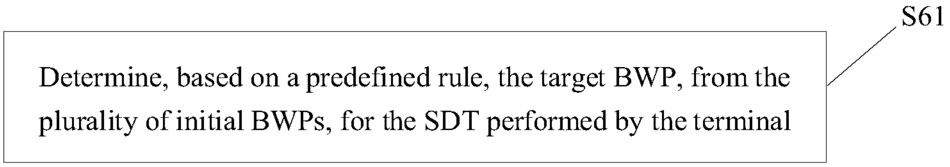
FIG. 7 is a flowchart illustrating a transmission method for SDT according to still another embodiment.

FIG. 7 is a flowchart illustrating a transmission method for SDT according to still another embodiment. As shown in FIG. 7, the transmission method for SDT is performed by a terminal, and includes the following step S61.

At step S61, in response to the terminal being configured with a plurality of initial BWPs, a target BWP, from the plurality of initial BWPs, for the SDT performed by the terminal is determined based on a predefined rule.

In the embodiments of the present disclosure, on the one hand, the predefined rule may include a rule according to which the initial BWP for the SDT performed by the terminal is the first Initial BWP, and on the other hand, the predefined rule may also include a rule according to which the initial BWP for the SDT performed by the terminal is the second initial BWP.

The predefine rule in the embodiments of the present disclosure may include a rule for performing the uplink SDT and may include a rule for performing the downlink SDT.

In an embodiment, the predefined rule may include a rule for performing the uplink SDT, for example, the predefined rule may include a rule determined based on a bandwidth.

For the uplink SDT, in response to the terminal being configured with the first Initial UL BWP and the second Initial UL BWP, and a bandwidth of the first initial uplink BWP and a bandwidth of the second initial uplink BWP both being less than a receiving and transmitting bandwidth of the terminal, the first initial uplink BWP or the second initial uplink BWP is determined as the target BWP for the SDT performed by the terminal. In response to the terminal being configured with a first initial uplink BWP and a second initial uplink BWP, and a bandwidth of the first initial uplink BWP and/or a bandwidth of the second initial uplink BWP being greater than a receiving and transmitting bandwidth of the terminal, the terminal determines that an initial uplink BWP meeting a reception capability of the terminal is the target BWP for the SDT performed by the terminal.

In an example, for the uplink SDT, if the bandwidths of both the first initial UL BWP and the second initial UL BWP are less than the receiving and transmitting bandwidth of the terminal, the uplink SDT is performed on either the first initial UL BWP or the second initial UL BWP by default, otherwise the uplink SDT is performed on the UL BWP meeting the reception capability of the terminal.

In an embodiment, the predefined rule may include a rule for performing the downlink SDT, and determining, based on a predefined rule, the target BWP, from the plurality of initial BWPs, for the SDT performed by the terminal includes at least one of the following A, B or C.

A: determining, in response to the second initial downlink BWP being configured with at least one of a SSB and a paging message, the second initial downlink BWP as the target BWP for the SDT performed by the terminal.

B: determining, in response to the second initial downlink BWP not being configured with at least one of a SSB and a paging message, the first initial downlink BWP as the target BWP for the SDT performed by the terminal.

C: determining, based on a BWP on which an uplink SDT is performed, a target BWP for a downlink SDT.

In an example, an initial downlink BWP having a same center frequency as an initial uplink BWP, on which the uplink SDT is performed, is determined as the target BWP for the downlink SDT. For example, in a TDD system, the DL BWP having the same center frequency as the UL BWP on which the uplink SDT is performed is selected to carry the SDT downlink transmission.

In another example, an initial downlink BWP having a same BWP identifier as an initial uplink BWP, on which the uplink SDT is performed, is determined as the target BWP for the downlink SDT. For example, the DL BWP having the same BWP identifier as the determined UL BWP is selected to carry the downlink SDT.

In embodiments of the present disclosure, the initial downlink BWP having the same center frequency as the initial uplink BWP, on which the uplink SDT is performed, is determined as the target BWP for the downlink SDT, or the initial downlink BWP having the same BWP identifier as the initial uplink BWP, on which the uplink SDT is performed, is determined as the target BWP for the downlink SDT, such that the uplink transmission and the downlink SDT can share the same resource, and the switching delay is reduced.

It is to be understood that, in the embodiments of the present disclosure, the terminal is configured with the first initial BWP and the second initial BWP, and the initial BWP for the SDT performed by the terminal can be determined by applying any one or more manners of the default manner, the network configuration manner, and the predefined rule manner described herein.

It will be noted that the steps in the embodiments may be performed either individually or in combination in any manner and order. Those skilled in the art may combine them as desired, and the embodiments of the present disclosure are not limited thereto.

Based on the same conception, the embodiments of the present disclosure provide a transmission method for SDT performed by a network device.

Figure 8:
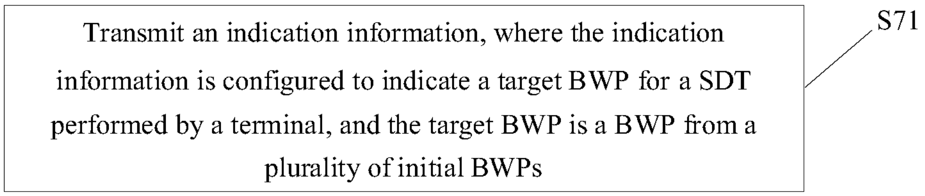
FIG. 8 is a flowchart illustrating a transmission method for SDT according to still another embodiment.

FIG. 8 is a flowchart illustrating a transmission method for SDT according to still another embodiment, and the method may be performed alone or in combination with other embodiments of the present disclosure. As shown in FIG. 8, the transmission method for SDT is performed by a network device and includes the following step S71.

At step S71, indication information is transmitted by the network device, where the indication information is configured to indicate a target BWP for a SDT performed by a terminal, and the target BWP is a BWP from a plurality of initial BWPs.

In the embodiments of the present disclosure, the network device transmits the indication information to indicate the target BWP for the SDT performed by the terminal, that can be understood as an implementation of the determination of the BWP for the SDT based on the network configuration.

The plurality of initial BWPs may be understood to be initial BWPs configured for the terminal. The plurality of initial BWPs may be of different bandwidths for terminals of different capability types, allowing the terminals to perform communication based on the initial BWPs that apply to their own bandwidth capabilities.

In an embodiment, the first initial BWP falls within a bandwidth capability range of a first type of terminal. The second initial BWP falls within a bandwidth capability range of a second type of terminal. The capability of the first type of terminal is greater than the capability of the second type of terminal.

For example, in an example, the first type of terminal may be an ordinary terminal (not a Redcap terminal), and the second type of terminal may be a Redcap terminal (reduced capability UE). The ordinary terminal is relative to a Redcap terminal. For example, the ordinary terminal may be a UE that supports NR. The Redcap terminal may be configured with at least one first initial BWP and at least one second initial BWP.

The terminal involved in an embodiment of the present disclosure may be a Redcap terminal that is configured with a plurality of initial BWPs including a first initial BWP and a second initial BWP, and is configured to support the SDT.

In an embodiment, the plurality of initial BWPs includes the first initial BWP and the second initial BWP. A target BWP for the SDT performed by the terminal includes the first initial BWP or the second initial BWP.

The plurality of initial BWPs may include an initial UL BWP or an initial DL BWP in the embodiments of the present disclosure.

In an embodiment, the first initial BWP includes a first initial UL BWP, and the second initial BWP includes a second initial UL BWP. On the one hand, the target BWP may include the first initial UL BWP. On the other hand, the target BWP may include the second initial UL BWP.

In an embodiment, the first initial BWP includes a first initial DL BWP, and the second initial BWP includes a second initial DL BWP. On the one hand, the target BWP may include a first initial DL BWP. On the other hand, the target BWP may include a second initial DL BWP.

It will be understood that the transmission method for SDT performed by the network device in the embodiments of the present disclosure corresponds to the transmission method for SDT performed by the terminal in the embodiments of the present disclosure, therefore, the part of the description of the transmission method for SDT performed by the network device that is not exhaustive may refer to the transmission method for SDT performed by the terminal described herein, and will not be described in detail herein.

It will be further understood that the transmission methods for SDT provided by the embodiments of the present disclosure can be applicable to a scenario in which the terminal interacts with the network device to realize the SDT. The functions realized by the terminal and the network device involved in the specific realization process can be referred to the relevant descriptions involved in the included embodiments, and will not be described in detail herein.

It is to be noted that those skilled in the art may understand that the various embodiments/examples involved in the present disclosure can be implemented in conjunction or independently. Whether these embodiments are implemented independently or in conjunction, their implementation principles are similar. In the present disclosure, some embodiments are explained in conjunction with the implementation. Of course, those skilled in the art will understand that the embodiments are not a limitation of the present disclosure.

Based on the same conception, the embodiments of the present disclosure also provide a transmission apparatus for SDT.

It will be understood that the transmission apparatus for SDT provided in the embodiments of the present disclosure, in order to realize the above-described functions, includes a hardware structure and/or a software module corresponding to performing the respective functions. In conjunction with the units and algorithmic steps of the various embodiments disclosed in the present disclosure, the embodiments of the present disclosure are capable of being realized in the form of hardware or a combination of hardware and computer software. Whether a particular function is performed as hardware or computer software driving hardware depends on the particular application and design constraints of the technical solution. Those skilled in the art may use a different approach for each particular application to implement the described function, but the embodiments should not be considered beyond the scope of the technical solutions of the present disclosure.

It is noted that the steps in the embodiments may be performed individually or in combination in any manner and order. Those skilled in the art may combine them as desired, and the embodiments of the present disclosure are not limited thereto.

Also, it will be noted that the embodiments of the network device may also be used in combination with the embodiments on the terminal in any manner, and the embodiments of the present disclosure are not limited thereto.

Figure 9:
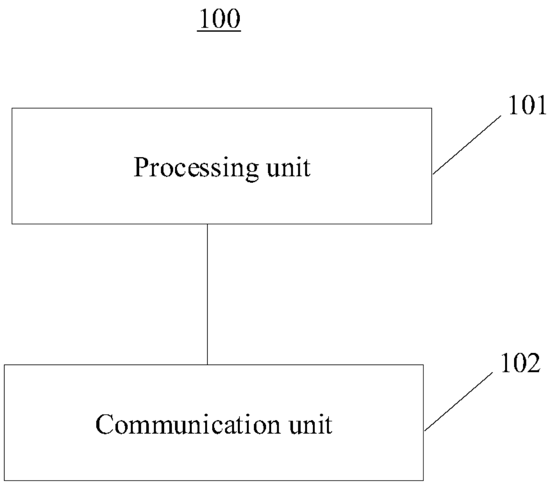
FIG. 9 is a block diagram illustrating a transmission apparatus for SDT according to an embodiment.

FIG. 9 is a block diagram illustrating a transmission apparatus for SDT according to an embodiment. As shown in FIG. 9, the transmission apparatus 100 for SDT is applied to a terminal and includes a processing unit 101 and a communication unit 102.

The processing unit 101 is configured to determine, in response to the terminal being configured with a plurality of initial bandwidth parts (BWPs), a target BWP, from the plurality of initial BWPs, for an SDT performed by the terminal. The communication unit 102 is configured to perform, based on the target BWP, the SDT.

In an embodiment, the plurality of initial BWPs include a first initial BWP and a second initial BWP, and the target BWP includes the first initial BWP or the second initial BWP.

In an embodiment, the first initial BWP includes a first initial uplink (UL) BWP, and the second initial BWP includes a second initial UL BWP. The communication unit 102 performs an uplink SDT on the first initial UL BWP or the second initial UL BWP.

In an embodiment, the first initial BWP includes a first initial downlink (DL) BWP, and the second initial BWP includes a second initial DL BWP. The communication unit 102 performs a downlink SDT on the first initial DL BWP or the second initial DL BWP.

In an embodiment, the processing unit 101 determines the first initial BWP as the target BWP for the SDT performed by the terminal. In an embodiment, the processing unit 101 determines the second initial BWP as the target BWP for the SDT performed by the terminal.

In an embodiment, the processing unit 101 is further configured to determine an initial BWP monitored on a cell on which the terminal camps. The processing unit 101 is further configured to determine that, in response to the target BWP being different from the initial BWP, the SDT is completed, and switch to the initial BWP.

In an embodiment, the target BWP is a second initial DL BWP, and the initial BWP monitored on the cell is a first initial DL BWP.

In an embodiment, the processing unit 101 is further configured to perform a measurement for SSB on the first initial DL BWP. In an embodiment, the processing unit 101 is further configured to perform a measurement for SSB on the second initial DL BWP, where the second initial DL BWP is configured with at least one of a SSB and a paging message.

In an embodiment, the communication unit 102 is further configured to receive indication information transmitted by a network device, where the indication information is configured to indicate the target BWP for the SDT performed by the terminal, and the target BWP is a BWP from the plurality of initial BWPs. The processing unit 101 is further configured to determine, based on the indication information, the target BWP, from the plurality of initial BWPs, for the SDT performed by the terminal.

In an embodiment, the processing unit 101 is further configured to determine, based on a predefined rule, the target BWP, from the plurality of initial BWPs, for the SDT performed by the terminal.

In an embodiment, the processing unit 101 determines, from the plurality of initial BWPs, the target BWP for the SDT performed by the terminal based on the predefined rule in at least one of the following manners.

In a first manner, in response to the terminal being configured with a first initial uplink BWP and a second initial uplink BWP, and a bandwidth of the first initial uplink BWP and a bandwidth of the second initial uplink BWP both being less than a receiving and transmitting bandwidth of the terminal, determining the first initial uplink BWP or the second initial uplink BWP as the target BWP for the SDT performed by the terminal. Additionally, or alternatively, in a second manner, in response to the terminal being configured with a first initial uplink BWP and a second initial uplink BWP, and a bandwidth of the first initial uplink BWP and/or a bandwidth of the second initial uplink BWP being greater than a receiving and transmitting bandwidth of the terminal, determining that an initial uplink BWP meeting a reception capability of the terminal is the target BWP for the SDT performed by the terminal.

In an embodiment, the processing unit 101 determines, from the plurality of initial BWPs, the target BWP for the SDT performed by the terminal based on the predefined rule in at least one of the following manners: determining, in response to the second initial downlink BWP being configured with at least one of a SSB and a paging message, the second initial downlink BWP as the target BWP for the SDT performed by the terminal; determining, in response to the second initial downlink BWP being not configured with at least one of a SSB and a paging message, the first initial downlink BWP as the target BWP for the SDT performed by the terminal; or determining, based on a BWP on which an uplink SDT is performed, a target BWP for a downlink SDT.

In an embodiment, the processing unit 101 determines an initial downlink BWP having a same center frequency as an initial uplink BWP, on which the uplink SDT is performed, as the target BWP for the downlink SDT; or determines an initial downlink BWP having a same BWP identifier as an initial uplink BWP, on which the uplink SDT is performed, as the target BWP for the downlink SDT. The processing unit 101 may be any type of component(s) capable of performing the described functions, such as, but not limited to, a processor, CPU, GPU, etc. The communication unit 102 may be any type of component(s) capable of performing the described functions, such as, but not limited to, an input/output interface, a communication component, etc.

Figure 10:
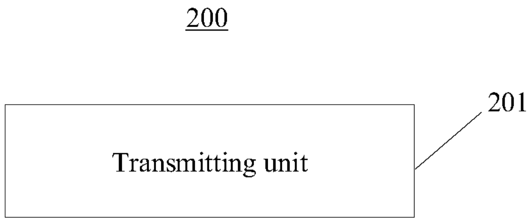
FIG. 10 is a block diagram illustrating a transmission apparatus for SDT according to another embodiment.

FIG. 10 is a block diagram illustrating a transmission apparatus for SDT according to another embodiment. As shown in FIG. 10, the transmission apparatus 200 for SDT is applied to a network device and includes a transmitting unit 201.

The transmitting unit 201 is configured to transmit indication information, where the indication information is configured to indicate a target BWP for a SDT performed by a terminal, and the target BWP is a BWP from a plurality of initial BWPs. The transmitting unit 201 may be any type of component(s) capable of performing the described functions, such as, but not limited to an input/output interface, a communication component, etc.

Regarding the apparatuses in the included embodiments, the specific manner in which each module performs operations has been described in detail in the examples of the methods, and will not be described in detail here.

Figure 11:
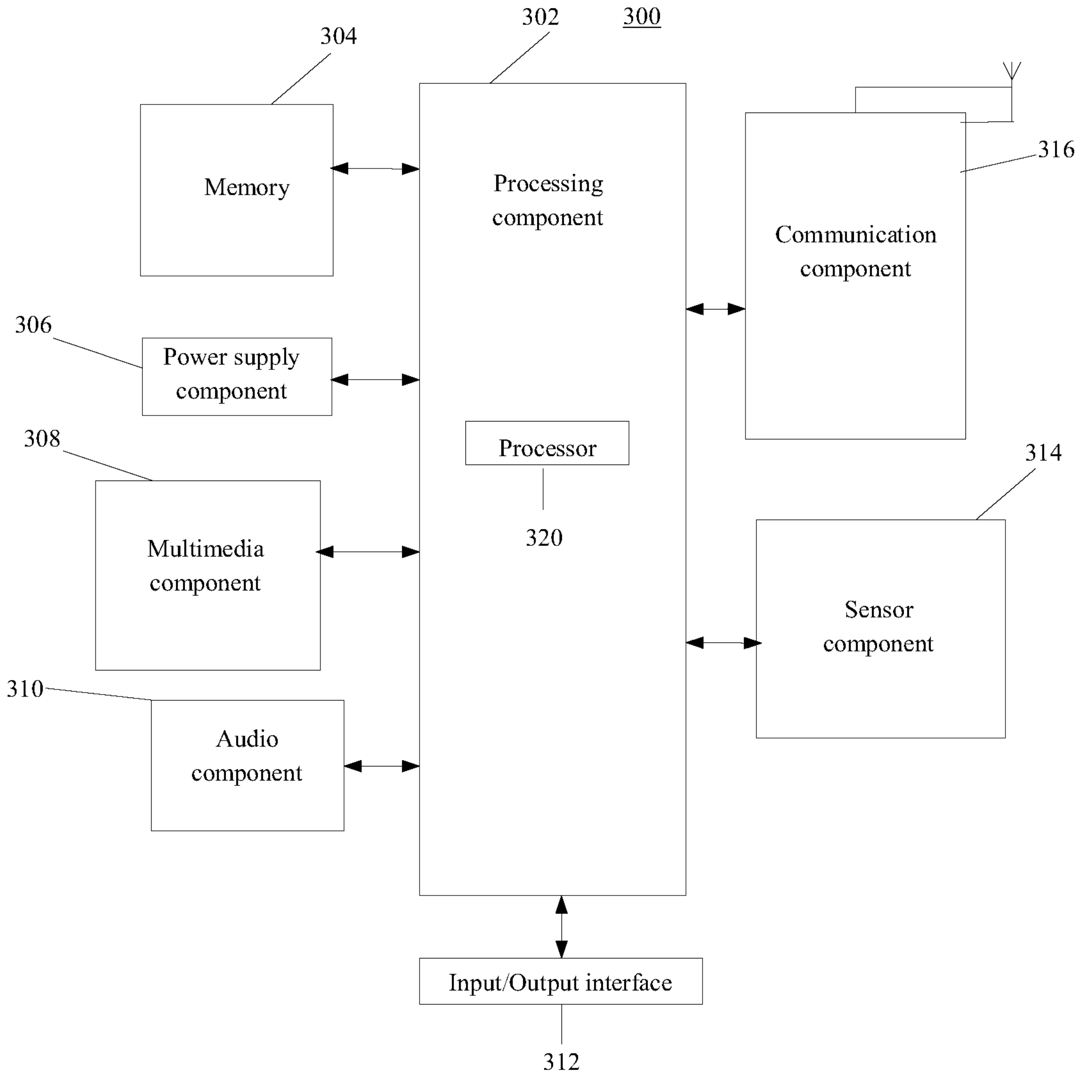
FIG. 11 is a block diagram illustrating a transmission device for SDT according to an embodiment.

FIG. 11 is a block diagram illustrating a transmission device for SDT according to an embodiment. For example, the transmission device 300 for SDT can be provided as the terminal involved in the included embodiments. For example, the device 300 can be a mobile phone, a computer, a digital broadcast terminal, a message transmitting and receiving device, a gaming console, a tablet device, a medical device, a fitness device, a personal digital assistant, and the like.

Referring to FIG. 11, the device 300 can include one or more of the following components: a processing component 302, a memory 304, a power supply component 306, a multimedia component 308, an audio component 310, an input/output (I/O) interface 312, a sensor component 314, and a communication component 316.

The processing component 302 usually controls overall operations of the device 300, such as operations related to display, a telephone call, data communication, a camera operation, and a record operation. The processing component 302 may include one or more processors 320 to execute instructions to complete all or a part of the steps of the above methods. Further, the processing component 302 may include one or more modules to facilitate interaction between the processing component 302 and another component. For example, the processing component 302 may include a multimedia module to facilitate the interaction between the multimedia component 308 and the processing component 302.

The memory 304 is configured to store different types of data to support the operations of the device 300. Examples of such data include instructions, contact data, phone book data, messages, pictures, videos, and so on for any application or method that operates on the device 300. The memory 304 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or optical disk.

The power supply component 306 supplies power for different components of the device 300. The power supply component 306 may include a power supply management system, one or more power supplies, and other components associated with generating, managing, and distributing power for the device 300.

The multimedia component 308 includes a screen for providing an output interface between the device 300 and a user. In some embodiments, the screen may include a liquid crystal display (LCD) and/or a touch panel (TP). If the screen includes a touch panel, the screen may be implemented as a touch screen for receiving an input signal from a user. The touch panel may include one or more touch sensors for sensing a touch, a slide, and a gesture on the touch panel. The touch sensor may not only sense a boundary of a touching or sliding movement, but also detect duration and pressure related to the touching or sliding operation. In some embodiments, the multimedia component308 may include a front camera and/or a rear camera. When the device 300 is in an operation mode, such as a shooting mode or a video mode, the front camera and/or the rear camera can receive external multimedia data. Each of the front camera and the rear camera may be a fixed optical lens system or be of a focal length and a capability of an optical zoom.

The audio component 310 is configured to output and/or input an audio signal. For example, the audio component 310 may include a microphone (MIC). When the device 300 is in an operating mode, such as a call mode, a recording mode and a speech recognition mode, the microphone is configured to receive an external audio signal. The received audio signal may be further stored in the memory 304 or sent via the communication component 316. In some embodiments, the audio component 310 also includes a speaker for outputting an audio signal.

The I/O interface 312 may provide an interface between the processing component 302 and peripheral interface modules. The above peripheral interface modules may include a keyboard, a click wheel, buttons and so on. Such buttons may include but not limited to: a home button, a volume button, a start button and a lock button.

The sensor component 314 includes one or more sensors for providing state assessments in different aspects for the device 300. For example, sensor component 314 can detect an open/closed state of device 300, a relative positioning of components, such as the display and keypad of device 300, and sensor component 314 can also detect a change in position of device 300 or a component of device 300, the presence or absence of user contact with device 300, orientation or acceleration/deceleration of device 300, and temperature change of device 300. The sensor component 314 may include a proximity sensor configured to detect the presence of a nearby object without any physical contact. The sensor component 314 may also include an optical sensor, such as a CMOS or CCD image sensor used in an imaging application. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 may access a wireless network based on a communication standard, such as WiFi, 2G or 3G, or a combination thereof.

In some embodiments, the communication component 316 may receive a broadcast signal or broadcast-related information from an external broadcast management system via a broadcast channel. In an example, the communication component 316 may also include a near field communication (NFC) module to facilitate short-range communications. For example, the NFC module may be implemented based on a radio frequency identification (RFID) technology, an infrared data association (IrDA) technology, an ultra wide band (UWB) technology, a Bluetooth (BT) technology and other technologies.

In an example, the device 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the included examples.

In an example, a non-transitory computer readable storage medium including instructions, such as the memory 304 including instructions, is also provided. The above instructions may be executed by the processor 320 of the device 300 to complete the above method. For example, the non-transitory computer readable storage medium may be a read-only memory (ROM), a random access memory (RAM), a CD-ROM, a magnetic tape, a floppy disk and an optical data storage device, etc.

Figure 12:
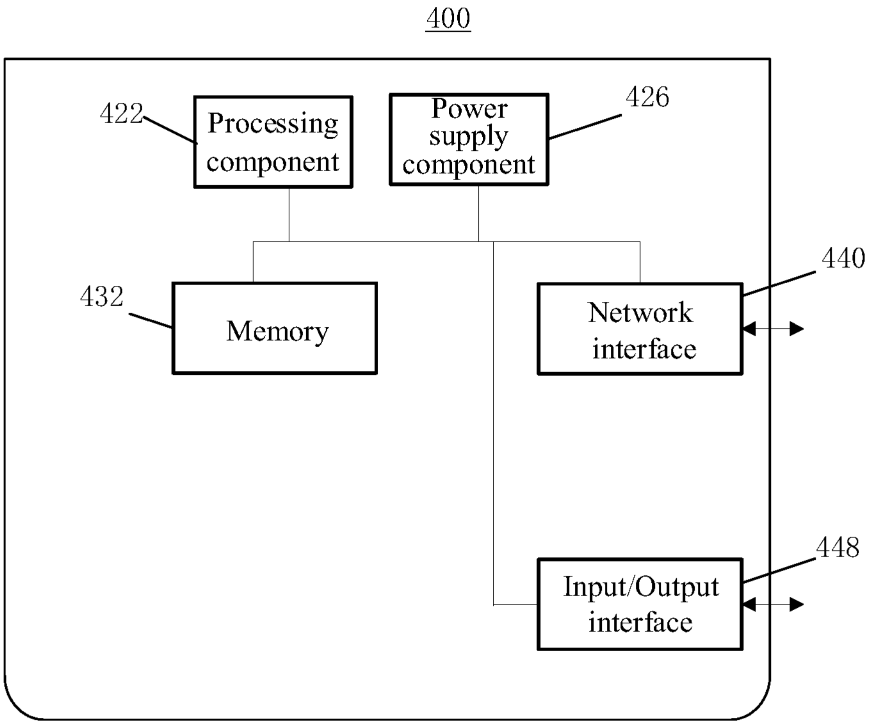
FIG. 12 is a block diagram illustrating a transmission device for SDT according to another embodiment.

FIG. 12 is a block diagram illustrating a transmission device for SDT according to another embodiment. For example, the transmission device 400 for SDT may be provided as a network device. Referring to FIG. 12, the device 400 includes a processing component 422, which further includes one or more processors (not shown), and memory resources represented by a memory 432 for storing instructions, such as an application program, that may be executed by the processing component 422. The application program stored in the memory 432 may include one or more modules each corresponding to a set of instructions. In addition, the processing component 422 is configured to execute the instructions to perform the method described herein.

The device 400 may also include a power supply component 426 configured to perform power management of the device 400, a wired or wireless network interface 440 configured to connect the device 400 to a network, and an input/output (I/O) interface 448. The device 400 may operate an operating system based on an operating system stored in the memory 432, such as Windows Server™, Mac OS X™, Unix™, Linux™, FreeBSD™ or the like.

The technical solution provided by the embodiments of the present disclosure may include the following beneficial effect: in the case where the terminal is configured with the plurality of initial BWPs, the target BWP for the SDT performed by the terminal is determined from the plurality of initial BWPs, and the SDT is performed based on the target BWP, such that selecting a BWP for performing the SDT is achieved in the case where the terminal is configured with the plurality of initial BWPs.

In an example, a non-transitory computer readable storage medium including instructions, such as the memory 432 including instructions, is also provided. The instructions may be executed by the processing component 422 of the device 400 to complete the above method. For example, the non-transitory computer readable storage medium may be a read-only memory (ROM), a random access memory (RAM), a CD-ROM, a magnetic tape, a floppy disk, and an optical data storage device, etc.

It will be further understood that "plurality" in the present disclosure means two or more, and other quantifiers are similar. The wording "and/or" describes an association relationship of an associated object, and indicates that three relationships may exist, e.g., A and/or B, which may be expressed as: A alone, both A and B, and B alone. The character "/" generally indicates an "or" relationship between the related objects. The terms "a", "the" and "said" in their singular forms in the present application and the appended claims are also intended to include plurality, unless clearly indicated otherwise in the context.

It will be understood that the terms, such as "first", "second", etc., may be used to describe various information, such information should not be limited to these terms. These terms are used only to distinguish the same type of information from each other, and do not indicate a particular order or level of importance. Indeed, the expressions "first" and "second" are used interchangeably. For example, without departing from the scope of the present disclosure, first information may be referred as second information; and similarly, the second information may also be referred as the first information.

It will be further understood that the embodiments of the present disclosure, while describing operations in a particular order in the accompanying drawings, should not be construed as requiring that the operations be performed in the particular order shown or in a serial order, or that all of the operations shown be performed in order to obtain a desired result. In some embodiments, multitasking and parallel processing are also possible or may be advantageous.

After considering the specification and practicing the present disclosure, those skilled in the art would easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples are considered as exemplary only, with a true scope and spirit of the present disclosure being indicated by the following claims.

It is to be understood that the present disclosure is not limited to the precise construction described herein and shown in the drawings, and that various modifications and changes may be made without departing from the scope thereof. The scope of the present disclosure is to be limited only by the appended claims.

The invention claimed is:

1. A transmission method for small data transmission (SDT), performed by a terminal, and comprising:

determining a target bandwidth part (BWP), from a plurality of initial BWPs, for a SDT performed by the terminal; and performing, based on the target BWP, the SDT, wherein the plurality of initial BWPs comprise a first initial BWP and a second initial BWP, and the target BWP comprises the first initial BWP or the second initial BWP;

wherein determining the target BWP, from the plurality of initial BWPs, for the SDT performed by the terminal comprises at least one of:

determining, in response to the second initial downlink BWP being configured with at least one of a SSB and a paging message, the second initial downlink BWP as the target BWP for the SDT performed by the terminal;

determining, in response to the second initial downlink BWP being not configured with at least one of a SSB and a paging message, the first initial downlink BWP as the target BWP for the SDT performed by the terminal; or determining, based on a BWP on which an uplink SDT is performed, a target BWP for a downlink SDT:

wherein determining, based on the BWP on which the uplink SDT is performed, the target BWP for the downlink SDT comprises:

determining an initial downlink BWP having a same center frequency as an initial uplink BWP, on which the uplink SDT is performed, as the target BWP for the downlink SDT: or determining an initial downlink BWP having a same BWP identifier as an initial uplink BWP, on which the uplink SDT is performed, as the target BWP for the downlink SDT.

2. The method of claim 1, wherein the first initial BWP comprises a first initial uplink BWP, the second initial BWP comprises a second initial uplink BWP, and performing, based on the target BWP, the SDT comprises:

performing an uplink SDT on the first initial uplink BWP or the second initial uplink BWP; or the first initial BWP comprises a first initial downlink BWP, the second initial BWP comprises a second initial downlink BWP, and performing, based on the target BWP, the SDT comprises:

performing a downlink SDT on the first initial downlink BWP or the second initial downlink BWP.

3. The method of claim 2, further comprising:

determining an initial BWP monitored on a cell on which the terminal camps; and determining that, in response to the target BWP being different from the initial BWP, the SDT is completed, and switching to the initial BWP, wherein the target BWP is the second initial downlink BWP, and the initial BWP is the first initial downlink BWP.

4. The method of claim 2, further comprising:

performing a measurement for synchronization signal and physical broadcast channel (PBCH) block (SSB) on the first initial downlink BWP; or performing a measurement for SSB on the second initial downlink BWP, wherein the second initial downlink BWP is configured with at least one of a SSB and a paging message.

5. The method of claim 1, wherein determining the target BWP, from the plurality of initial BWPs, for the SDT performed by the terminal comprises:

receiving indication information transmitted by a network device, wherein the indication information is configured to indicate the target BWP for the SDT performed by the terminal.

6. The method of claim 1, wherein determining the target BWP, from the plurality of initial BWPs, for the SDT performed by the terminal comprises:

in response to the terminal being configured with a first initial uplink BWP and a second initial uplink BWP, and a bandwidth of the first initial uplink BWP and a bandwidth of the second initial uplink BWP both being less than a receiving and transmitting bandwidth of the terminal, determining the first initial uplink BWP or the second initial uplink BWP as the target BWP for the SDT performed by the terminal; or in response to the terminal being configured with a first initial uplink BWP and a second initial uplink BWP, and a bandwidth of the first initial uplink BWP or a bandwidth of the second initial uplink BWP being greater than a receiving and transmitting bandwidth of the terminal, determining that an initial uplink BWP meeting a reception capability of the terminal is the target BWP for the SDT performed by the terminal.

7. A transmission device for small data transmission (SDT), comprising:

a processor; and a memory storing instructions;

wherein the instructions, when executed by the processor, cause the processor to perform operations comprising:

determining a target bandwidth part (BWP), from a plurality of initial BWPs, for a SDT performed by the terminal; and performing, based on the target BWP, the SDT, wherein the plurality of initial BWPs comprise a first initial BWP and a second initial BWP, and the target BWP comprises the first initial BWP or the second initial BWP, wherein determining the target BWP, from the plurality of initial BWPs, for the SDT performed by the terminal comprises at least one of:

determining, in response to the second initial downlink BWP being configured with at least one of a SSB and a paging message, the second initial downlink BWP as the target BWP for the SDT performed by the terminal;

determining, in response to the second initial downlink BWP being not configured with at least one of a SSB and a paging message, the first initial downlink BWP as the target BWP for the SDT performed by the terminal; or determining, based on a BWP on which an uplink SDT is performed, a target BWP for a downlink SDT:

wherein determining, based on the BWP on which the uplink SDT is performed, the target BWP for the downlink SDT comprises:

determining an initial downlink BWP having a same center frequency as an initial uplink BWP, on which the uplink SDT is performed, as the target BWP for the downlink SDT: or determining an initial downlink BWP having a same BWP identifier as an initial uplink BWP, on which the uplink SDT is performed, as the target BWP for the downlink SDT.

8. A non-transitory computer readable storage medium, storing instructions thereon, wherein the instructions, when executed by a processor of a terminal, cause the terminal to perform the method of claim 1.

9. The device of claim 8, wherein the first initial BWP comprises a first initial uplink BWP, the second initial BWP comprises a second initial uplink BWP, and performing, based on the target BWP, the SDT comprises:

performing an uplink SDT on the first initial uplink BWP or the second initial uplink BWP; or wherein the first initial BWP comprises a first initial downlink BWP, the second initial BWP comprises a second initial downlink BWP, and performing, based on the target BWP, the SDT comprises:

performing a downlink SDT on the first initial downlink BWP or the second initial downlink BWP.

10. The device of claim 9, wherein the operations further comprise:

determining an initial BWP monitored on a cell on which the terminal camps; and determining that, in response to the target BWP being different from the initial BWP, the SDT is completed, and switching to the initial BWP, wherein the target BWP is the second initial downlink BWP, and the initial BWP is the first initial downlink BWP.

11. The device of claim 9, wherein the operations further comprise:

performing a measurement for synchronization signal and physical broadcast channel (PBCH) block (SSB) on the first initial downlink BWP; or performing a measurement for SSB on the second initial downlink BWP, wherein the second initial downlink BWP is configured with at least one of a SSB and a paging message.

12. The device of claim 11, wherein determining the target BWP, from the plurality of initial BWPs, for the SDT performed by the terminal comprises:

receiving indication information transmitted by a network device, wherein the indication information is configured to indicate the target BWP for the SDT performed by the terminal.

13. The device of claim 12, wherein determining the target BWP, from the plurality of initial BWPs, for the SDT performed by the terminal comprises:

in response to the terminal being configured with a first initial uplink BWP and a second initial uplink BWP, and a bandwidth of the first initial uplink BWP and a bandwidth of the second initial uplink BWP both being less than a receiving and transmitting bandwidth of the terminal, determining the first initial uplink BWP or the second initial uplink BWP as the target BWP for the SDT performed by the terminal; or in response to the terminal being configured with a first initial uplink BWP and a second initial uplink BWP, and a bandwidth of the first initial uplink BWP or a bandwidth of the second initial uplink BWP being greater than a receiving and transmitting bandwidth of the terminal, determining that an initial uplink BWP meeting a reception capability of the terminal is the target BWP for the SDT performed by the terminal.

* * * * *